Figure 1:
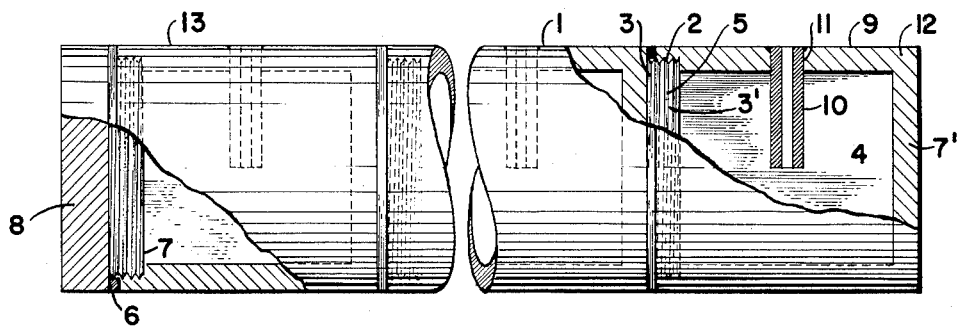

July 19, 1966 R. A. EISENHAUER ETAL 3,261,669
MULTIPLE HYDROGENATION INSERT
Filed Jan. 25, 1963 2 Sheets-Sheet 1

R. A. EISENHAUER
R. E. BEAL
INVENTOR.

BY
ATTORNEY

R.A. EISENHAUER.
R. E. BEAL
INVENTORS

3,261,669
MULTIPLE HYDROGENATION INSERT

Roger A. Eisenhauer, Washington, and Robert E. Beal, Elmwood, Ill., assignors to the United States of America as represented by the Secretary of Agriculture
Filed Jan. 25, 1963, Ser. No. 254,031
1 Claim. (Cl. 23—253)

A nonexclusive, irrevocable, royalty-free license in the invention herein described, throughout the world for all purposes of the United States Government, with the power to grant sublicenses for such purposes, is hereby granted to the Government of the United States of America.

This invention relates to an adapter device or insert for permitting a multiplicity of hydrogenations or similar gaseous reactions for analytical purposes on a semi-micro scale to be carried out simultaneously by first inserting our adapter device containing a different sample in each of at least two segments within the single cylindrical chamber of a commercially obtainable rocker-type high pressure hydrogenation reaction vessel.

The above indicated well known commercial device can be obtained with a 10 ml. stainless steel insert component or attachment for use when a single rather small sample must be hydrogenated. However, when many samples must be hydrogenated for analytical purposes and the equipment permits these to be reacted only successively, one at a time, time becomes important because only a few samples can be done per day.

The object of our invention is a substantially tubular, segmentally compartmentalized adapter assembly for insertion into a single chambered tubular rocker-type hydrogenation vessel or "bomb," said adapter assembly comprising a cooperating series of substantially uniform essentially hollow cylindrical segments, each containing a relatively deep chamber for holding a sample to be hydrogenated, the said chamber of each respective segment being continuous with the exterior (to provide access of pressurized hydrogen or other reactant gas surrounding the operationally inserted adapter assembly) via a small hole drilled at approximately mid-height through the cylindrical wall of each respective segment into the chamber thereof. To prevent any loss of the liquid materials from the gas inlet holes during rocking, a short length of pressure-type metal tubing has been inserted through the said gas inlet hole of each segment into each respective reaction chamber, cut flush with the external surface of the segment wall, and welded thereat.

As will appear more clearly in the drawings, our novel adapter unit, with the exception of one terminal segment and a cap component, comprises a suitable multiplicity (preferably five) of identical and interchangeable segments cut from a suitably thick rod of reaction-resistant metal such as stainless steel, each segment including the said non-uniform terminal segment having been drilled nearly its full length from one end to provide in each segment a cuplike hydrogenation chamber or cavity that is supplied from externally situated hydrogen or other pressurized gas via tubing that leads into the cavity from the gas inlet hole drilled through the segment wall. The fully identical segments are provided with cooperating means at each end for joining or coupling to one another to provide liquid-tight joints that also serve to close the free ends of the hydrogenation chambers. A preferred embodiment comprises internal threads at one end of each segment and corresponding external threads ending at a gasket at the other end of each segment. The single non-identical segment is terminal and since it does not serve as a cap for the hydrogenation cavity of an adjacent segment it differs from the others in lacking the external threads and gasket at its unopen end, although it is obvious that an additional "identical" segment (i.e., threaded at both ends) could be substituted for a typical segment without rendering the insert assembly inoperative. The exposed hydrogenation cavity of the opposite terminal segment of the coupled assembly is converted to a liquid-tight reaction chamber by means of a metal cap having corresponding external threads and a gasket. For convenience in firmly coupling the respective segments together with finger pressure, the outer wall of each segment may be banded with a knurled or roughened annulus.

Figure 2:
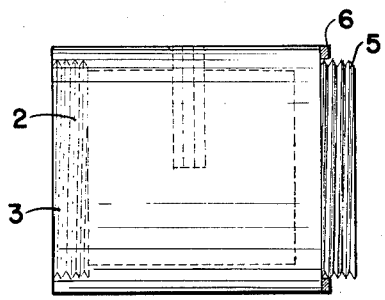
Figure 3:
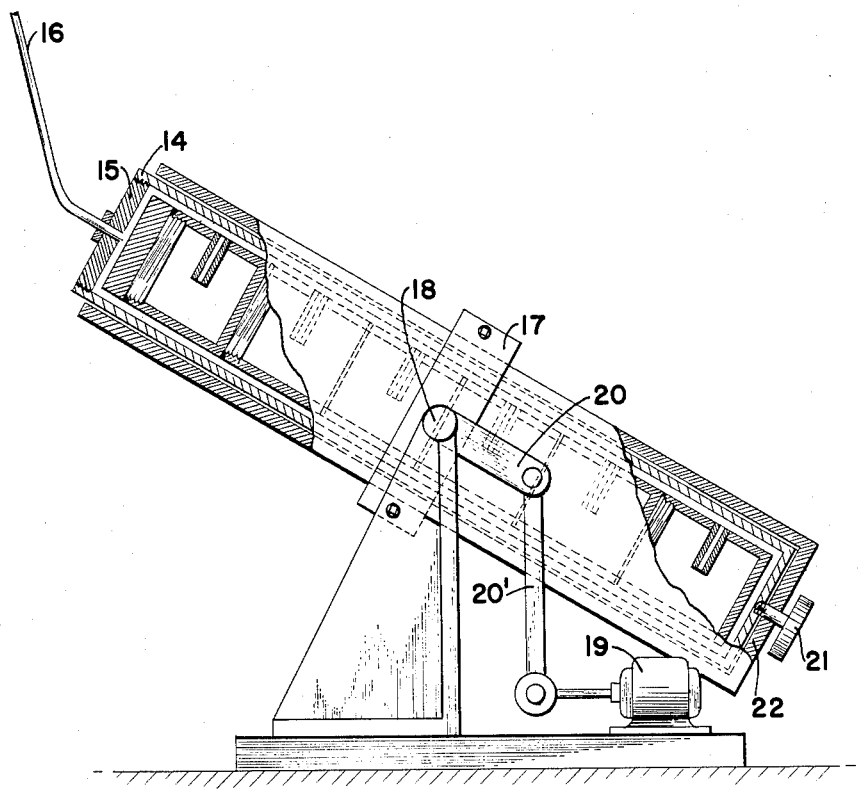

With reference to the drawings, FIGURE 1 represents a partial sectional view of our adapter insert assembly comprising a suitable multiplicity of identical and interchangeable segments 1 each of which has internal threads 2 at the drilled out open end 3 of circular hydrogenation cavity 4 that is closed for use (after introducing the liquid to be hydrogenated) by the mating externally threaded 5 and gasketed 6 closed end 7 of the next segment, or if terminal by an identically threaded and gasketed cap 8. Non-identical opposing terminal segment 9 is internally threaded at its open end 3' but is not interchangeable with any other segment inasmuch as it is not threaded and gasketed at its closed end 7'. The hydrogenation cavity of each respective chamber is made continuous with the exterior via tube 10 welded to hole 11 in hydrogenation cavity (segment) wall 12. FIGURE 2 is a side view of an interchangeable segment emphasizing internal threads 2, external threads 5, and gasket 6. For use the semi-micro quantities of the respective materials to be hydrogenated are separately placed in the hydrogenation cavity of the respective disassembled segments, the segments are coupled together, and the cap is screwed into the corresponding internal threads of interchangeable terminal segment 13. The assembled hydrogenation insert device of our invention containing the samples to be reacted is then placed in the tubular reaction chamber of a commercially available rocker-type hydrogenation reactor. FIGURE 3 is an assembly drawing in partial section showing our multiple hydrogenation assembly within the tubular insert 14 of a commercially available reactor device having a screw-in cap 15 with gas-admission fitting 16, rocker clamp 17 supported on rocker shaft 18 activated by motor 19 through rocker arms 20 and 20'. Adjustment bolt 21 threads into the back of tubular insert 14 and anchors it within outer wall 22 of the commercial reactor device.

For purposes of illustration our preferred embodiment comprises five interchangeable segments each 1.875 inches long cut from a 1.5 inch diameter stainless steel rod. Each segment is drilled with a 1.25 inch bit to a depth of 1.5 inches to provide a cup-like hydrogenation chamber. To provide access of externally applied hydrogen or other gaseous reactant to the hydrogenation chamber of each segment an 0.25 inch hole has been drilled at a 90 degree angle through the wall of each segment into the cup-like hydrogenation chamber at a point about halfway between the ends of each segment and a 0.625 inch length of inwardly directed small bore pressure tubing is welded in the hole to prevent loss of sample from the rocking motion that is applied during the hydrogenation. Each interchangeable segment has internal machine threads at the open end of the segment and corresponding external threads ending at a tightly fitting "Teflon" ring gasket at the undrilled (closed) end of the segment. The single non-interchangeable segment is identical with the others excepting that the undrilled end is not threaded and gasketed. The externally threaded and gasketed portion of the cap member is identical with the externally threaded portions of the segments and ends in an 0.25 inch thick flange portion having the same diameter as the segments.

Thus, the six segments and cap when assembled have a total length of 10.875 inches.

For use, semimicro quantities of the respective vegetable oils or other materials to be hydrogenated are placed in the described cup-like reaction chamber cavities of the respective disassembled segments of our invention, catalyst is also placed in each segment, the segments are then screwed tightly together so that the side holes are in alignment and the cap is screwed into the uppermost segment thus forming a unitary structure which is then deposited through the uncapped opening of the reaction chamber insert of the commercial vessel so that it rests along the inner wall thereof. The so far described assembly is then placed in the supplied sleeve of a conventional rocker device having a heating jacket and means for introducing hydrogen or other gas through a pressure cap into the reaction chamber of the commercial device, and the commercial reaction chamber insert is anchored by a bolt through the back wall of the rocker sleeve into the back wall of the commercial hydrogenation chamber.

Having disclosed our invention, we claim:

An adapter insert assembly for simultaneously permitting reaction of a pressurized gas with a multiplicity of samples of materials to be analyzed, said adapter assembly comprising a cooperating multiplicity of at least five identical and interchangeable substantially hollow cylindrical segments each unassembled segment having a deeply drilled open end and an unopened end so as to form a cup-like reaction chamber whose wall is penetrated at about mid-length by a short piece of transversely directed pressure tubing to permit access to said chamber of an externally applied pressurized gas, liquid-proof coupling means at the ends of each said segment, a non-interchangeable base segment differing from the other segments only in lacking a coupling means at its solid end, and a cap member having a liquid-proof means for coupling to the open end of the terminal interchangeable segment, the unopened end of each interchangeable segment cooperating with the open end of the adjoining segment to provide a liquid-proof closure therefor.

References Cited by the Examiner

UNITED STATES PATENTS

| | | | |
|---|---|---|---|
| 2,326,414 | 8/1943 | Thompson | 220—97 X |
| 2,692,856 | 10/1954 | Litman | 23—253 X |

MORRIS O. WOLK, *Primary Examiner.*

JOSEPH SCHOVRONEK, *Examiner.*